(12) United States Patent
Inoue

(10) Patent No.: US 7,667,825 B2
(45) Date of Patent: Feb. 23, 2010

(54) PROJECTOR, METHOD OF MEASURING DISTANCE TO THE PROJECTOR, AND METHOD AND PROGRAM FOR ACQUIRING INCLINATION ANGLES OF PROJECTION SCREEN

(75) Inventor: Hideaki Inoue, Musashimurayama (JP)

(73) Assignee: Casio Computor Co., Ltd., Tokyo (JP)

( * ) Notice: Subject to any disclaimer, the term of this patent is extended or adjusted under 35 U.S.C. 154(b) by 0 days.

(21) Appl. No.: 11/891,564

(22) Filed: Aug. 10, 2007

(65) Prior Publication Data
US 2008/0036995 A1 Feb. 14, 2008

(30) Foreign Application Priority Data
Aug. 14, 2006 (JP) .............................. 2006-221182

(51) Int. Cl.
*G01C 3/08* (2006.01)
(52) U.S. Cl. ...................................... 356/5.1
(58) Field of Classification Search ........... 356/3.01–22
See application file for complete search history.

(56) References Cited
U.S. PATENT DOCUMENTS
2002/0154812 A1* 10/2002 Chen et al. ................. 382/154
2002/0196424 A1* 12/2002 Sano et al. ................. 356/4.01
2004/0252283 A1* 12/2004 Ogawa ........................ 353/69
2005/0012907 A1* 1/2005 Inoue ........................... 353/70

FOREIGN PATENT DOCUMENTS
JP 2005-233880 A 9/2005

* cited by examiner

*Primary Examiner*—Thomas H Tarcza
*Assistant Examiner*—Luke D Ratcliffe
(74) *Attorney, Agent, or Firm*—Frishauf, Holtz, Goodman & Chick, P.C.

(57) ABSTRACT

A light source 165 of a projection unit 16 AM modulates an electric current supplied to a built-in LED. The projection unit 16 projects the modulated light on a projection screen. A photoreceiver 171 receives, with a time lag, a reflected portion of the modulated light from the screen, which corresponds to a time required for the light to travel from its projection to its reception. A calculation unit 173 acquires a phase difference between the projected light and its reflection at a respective one of a plurality of points on the screen, acquires a distance from the projector to the respective one of the plurality of points on the screen, and then acquires an inclination angle of the screen. Because the distance from the projector to a respective one of the plurality of points on the screen is acquired based on the corresponding phase difference, the measurement accuracy is improved compared to the triangular distance measuring method. The projector requires no distance measurement-only light source, thereby reducing the size of the projector.

13 Claims, 7 Drawing Sheets

PROJECTOR, METHOD OF MEASURING DISTANCE TO THE PROJECTOR, AND METHOD AND PROGRAM FOR ACQUIRING INCLINATION ANGLES OF PROJECTION SCREEN

BACKGROUND OF THE INVENTION

1. Field of the Invention

The present invention relates to projectors for images, methods of measuring a distance from the projector to a projection screen, and methods and programs for acquiring an inclination angle of the projection screen.

2. Background Art

With a projector which projects an image on a screen, if the screen is not vertical to the optical axis of the projector, the image would be distorted by the screen even when the original image is not distorted. In order to avoid this situation, the projector performs an Automatic Keystone Correction (AKC) on the image, which includes correction of distortion of the image without correcting the inclination of the screen.

There are projectors that include a device which measures an inclination angle of the screen relative to an ideal projection screen perpendicular to the optical axis thereof. These measuring devices use a sensor which operates based on a triangular distance measuring method to measure a plurality of distances each between the projector and a respective one of a like number of points on the screen. These devices calculate the inclination angle of the screen based on the plurality of distance data obtained by the measurement. Then, the projector performs the AKC on the image based on the angle calculated.

For example, Published Unexamined Patent Application 2005-233880 (pages 5, 6; FIGS. 1, 2) discloses such conventional projection screen inclination measuring device using, for example, a passive phase difference distance measuring sensor. This sensor focuses an image on each of a pair of image capturing elements with a lens and then detects a phase difference between the two focused images. This device measures a plurality of distances each between this device and a respective one of a plurality of points on the screen based on the phase difference sensed by the sensor.

With this device, as the distances increase, the measurement accuracy decreases. With a general front type projector, the projection distance is 3-4 m and the conventional projection screen inclination angle measuring device cannot achieve sufficient measurement accuracy for that projection distance.

Since the conventional phase difference sensor requires the lens for focusing images on the respective two image capturing elements, an interval equal to the focal distance is required between the lens and the image capturing elements. Especially, at present, the projectors and cameras sensors are required to be reduced in size, although the phase difference sensors are difficult to miniaturize further.

SUMMARY OF THE INVENTION

According to one preferable aspect, the present invention provides a projector comprising:

a projection unit that projects light on a projection screen;

an optical modulator that modulates the intensity of the light to be projected by the projection unit;

a photoreception unit that receives a portion of the light reflected at a point on the projection screen; and a distance measurement unit that detects a phase difference at the photoreception unit between the light projected by the projection unit and the portion of the light reflected at the point on the screen, and that measures the distance from the photoreception unit to the point on the projection screen based on the phase difference detected.

According to another aspect, the present invention provides a projector comprising:

a projection unit that projects light on a projection screen;

an optical modulator that modulates the intensity of the light to be projected by the projection unit;

a photoreceiver that comprises a plurality of photoreception elements disposed at a like number of points for receiving portions of the projected light reflected at a like number of points on the projection screen;

a distance measurement unit that detects a plurality of phase differences each between the projected light and a respective one of the portions of the projected light reflected at the like number of points on the screen and received by the plurality of photoreception elements and that measures a plurality of distances each from the projection unit to the respective one of the like number of points on the projection screen based on the detected phase difference concerned; and an inclination angle acquiring unit that acquires an inclination angle of the projection screen relative to an ideal projection screen vertical to the optical axis of the projected light based on the distances acquired by the distance measurement unit.

According to still another aspect, the present invention provides a method of measuring the distance between a projector and a point on a projection screen, the method comprising the steps of:

projecting light on a projection screen;

modulating the intensity of the light to be projected;

receiving a portion of the light reflected at a point on the projection screen; and detecting a phase difference at the projector between the light projected and the portion of the light reflected at the point on the screen, and measuring the distance from the projector to the point on the projection screen based on the phase difference detected.

According to a further another aspect, the present invention provides a method of acquiring an inclination angle of a projection screen for a projector, the method comprising the steps of:

projecting light on the projection screen;

modulating the intensity of the light to be projected;

receiving, at a plurality of points, portions of the projected light reflected at a like number of points on the projection screen;

detecting, at the projector, a plurality of phase differences each between the projected light and a respective one of the portions of the light reflected at the like number of points on the screen and measuring a plurality of distance each from the projector to the respective one of the like number of points on the projection screen; and acquiring an inclination angle of the projection screen relative to an ideal projection screen vertical to the optical axis of the projected light based on the distances acquired.

According to another aspect, the present invention provides a software program product embodied in a computer readable medium for performing the former one of the two methods described above.

According to still another aspect, the present invention provides a software program product embodied in a computer readable medium for performing the latter of the two methods.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

Figure 1:
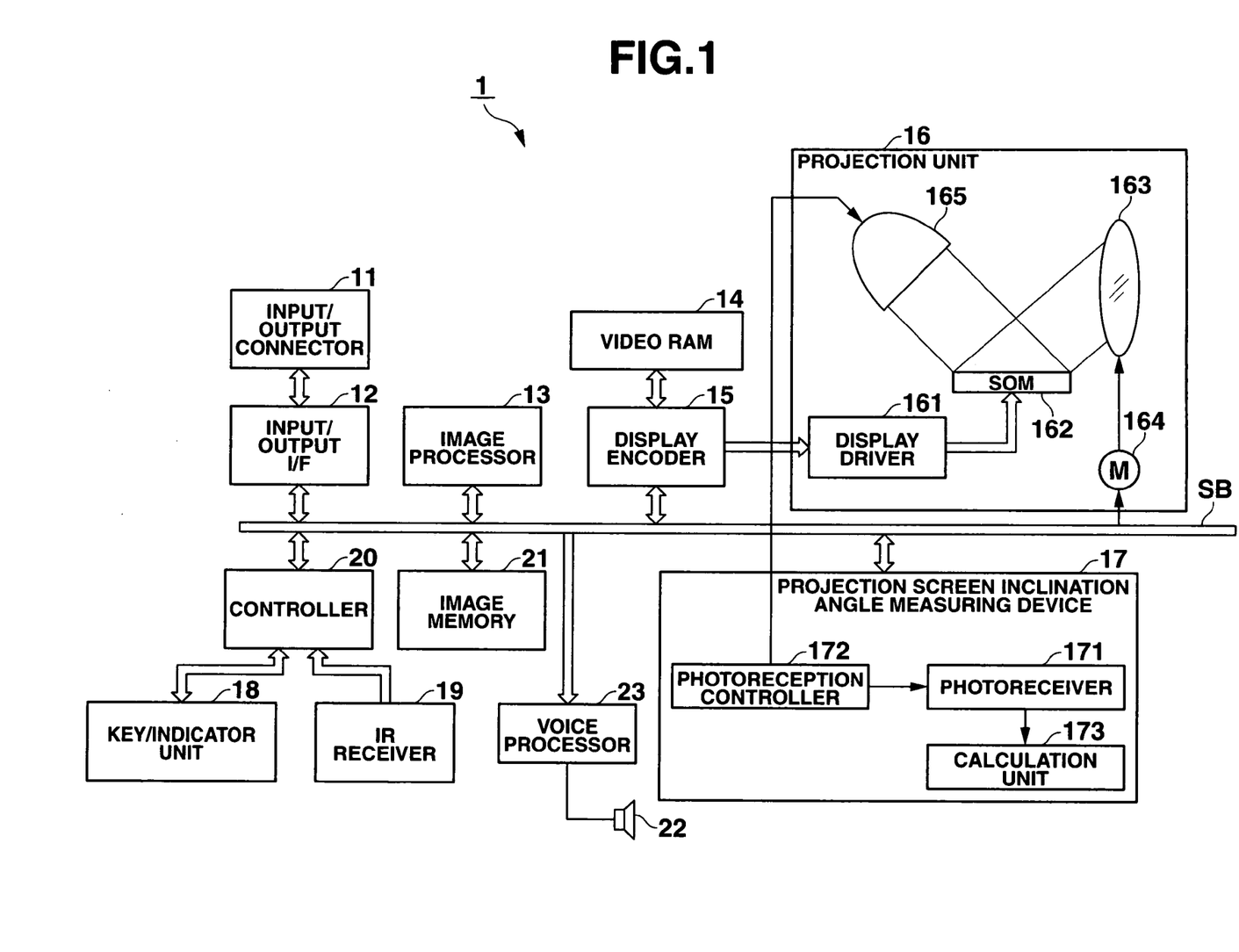
FIG. 1 is a block diagram of a projector as an embodiment of the present invention.

Referring to FIG. 1, a projector 1 according to an embodiment of the present invention comprises an input/output connector 11, an input/output I/F (interface) 12, an image processor 13, a video RAM 14, a display encoder 15, a projection unit 16, a screen inclination angle measuring unit 17, a key/indicator 18, an IR receiver 19, a controller 20, an image storage unit 21, a speaker 22, and a voice processor 23.

The input/output I/F (interface) 12, image processor 13, display encoder 15, screen inclination angle measuring unit 17, controller 20, image storage unit 21, and voice processor 23 are connected to a bus SB.

Even when the screen is inclined relative to an ideal projection screen, the projector 1 performs the AKC in order to display a distortion-free image. To this end, the projector 1 performs a light intensity modulation on the projected light, projects resulting light on the screen, and measures a time required from the projection of the light to the reception of the reflected light. The ideal projection screen is a plane vertical to the optical axis of the light which the projection unit 16 projects.

The time is equal to twice the time required for the light to travel from the projector 1 to the screen and determined based on the distance between the projector 1 and the screen.

The projector 1 measures times required from emission of the projection light on the screen to reception of respective portions of the light reflected at a plurality of points on the screen, calculates a like number of distances each between the projector 1 and a respective one of the plurality of points on the screen, acquires inclination angles of the screen based on the distances calculated and performs the AKC on the image based on the inclination angles acquired.

The input/output connector 11 has terminals through which an image signal is inputted/outputted to/from the projector. The input/output I/F 12 is an intermediate entity through which signals are input/output.

The image processor 13 performs various image processing tasks. The image processor 13 acquires an image signal received from the input/output connector 11 via the input/output I/F 12 and the system bus SB, and then converts the acquired image signal to an image signal of a preset format.

When receiving a signal indicative of the screen inclination angle and a command to perform the AKC from the controller 20, the image processor 13 acquires conversion parameters to perform the AKC and then performs the AKC on the image signal, using the acquired conversion parameters.

The video RAM 14 receives, loads and stores the image data therein.

The display encoder 15 loads and stores, in the video RAM 14, the image signal converted by the image processor 13. Further, the display encoder 15 produces a video signal from the image signal stored on the video RAM 14 and delivers the video signal to the projection unit 16.

The projection unit 16 produces and projects an optical image on the screen, and comprises a display driver 161, a spatial optical modulator (SOM) 162, a projection lens 163, a lens motor 164 and a light source 165.

The display driver 161 drives the SOM 162 for each color in a time-divisional manner at a rate, for example, of 30 frames/second so as to correspond to the image signal received from the display encoder 15.

The SOM 162 comprises, for example, a plurality of micro mirrors which form different-color images in a time-divisional manner.

Figure 2A:
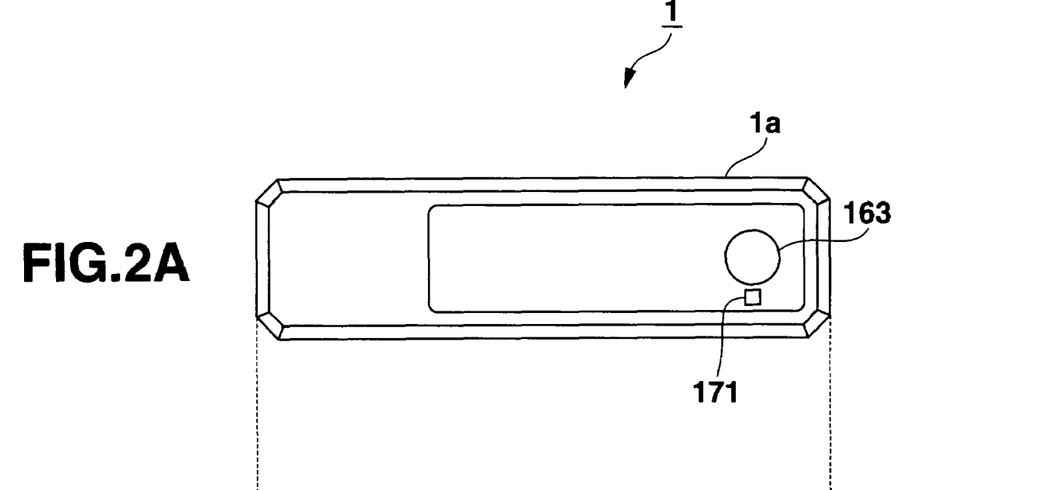
FIG. 2A is a front view of the projector.
Figure 2B:
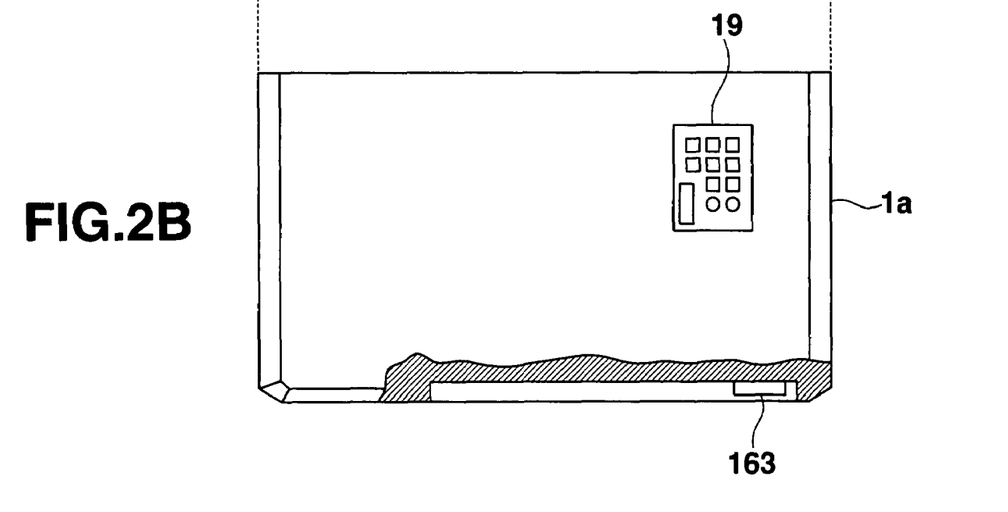
FIG. 2B is a plan view of the projector.

The projection lens 163 is used to focus, on the screen, an optical image formed by the SOM 162. The projection lens 163 has a mechanism for the zoom and focus adjustment. The projection lens 163 is attached to the front of the projector body 1a as shown in FIGS. 2A and 2B.

The lens motor 164 is used to perform the zooming and focusing operations by driving the mechanism provided for the projection lens 163.

Figure 3:
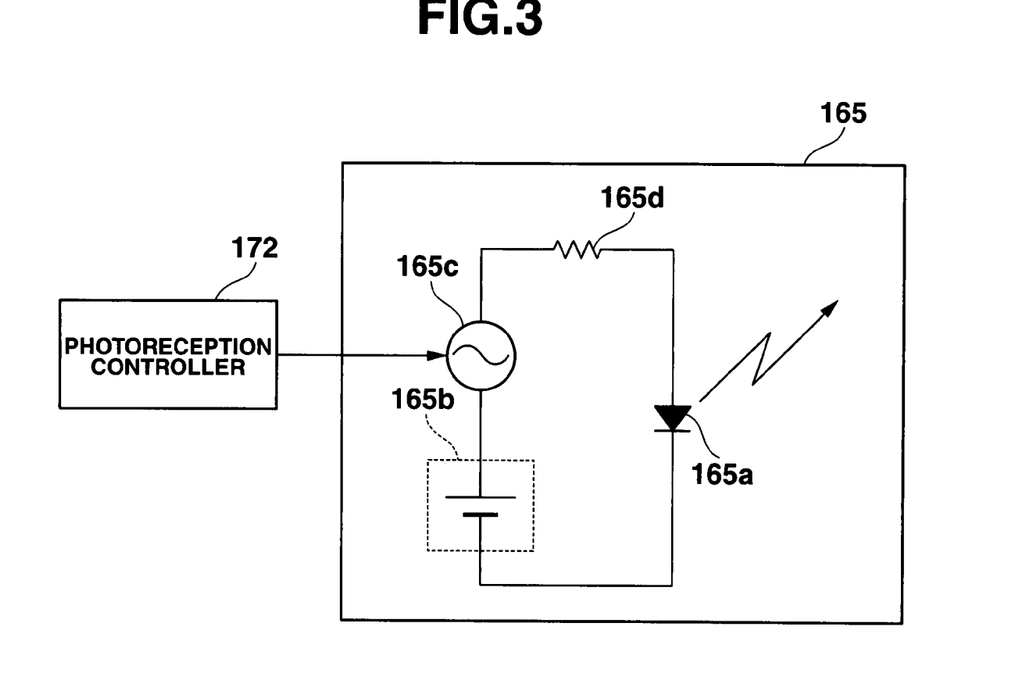
FIG. 3 is a circuit diagram of a light source of FIG. 1.

The light source 165 is used to produce light to be projected on the screen, and comprises an LED (Light Emitting Diode) 165a, a DC source 165b, an AM modulator 165c and a resister 165d, as shown in FIG. 3, thereby modulating the intensity of the projection light.

The DC source 165b supplies current to the LED 165a. The AM modulator 165c AM modulates the current to be fed from the DC source 165b to the LED 165a, for example, with a 10 MHz frequency, thereby modulating the intensity of the projection light by feeding the AM-modulated current via the resister 165d to the LED 165a. The light source 165 emits light against the SOM 162.

The screen inclination angle measuring device 17 is used to measure an inclination angle of the screen and comprises a photoreceiver 171, a photoreception controller 172 and a calculation unit 173.

Figure 4:
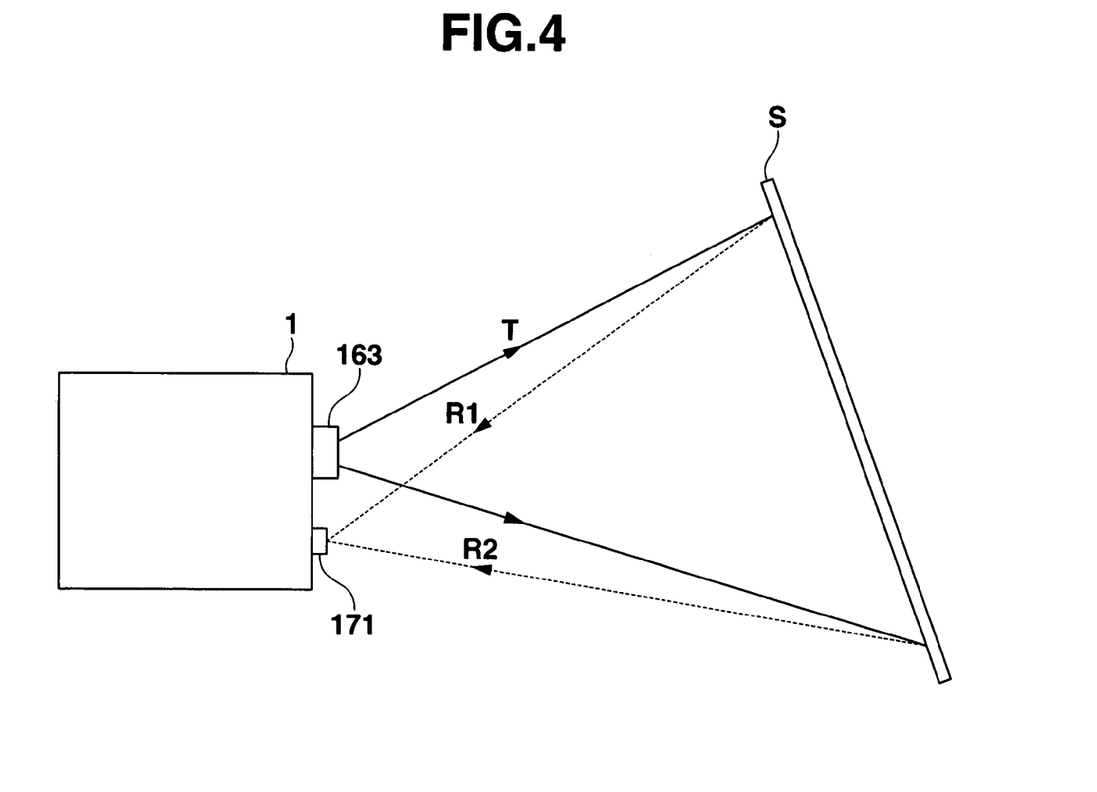
FIG. 4 illustrates a method of acquiring an inclination angle of a screen.

As shown in FIG. 4, the photoreceiver 171 receives reflected light portions R1 and R2 from two corresponding points on an image projected on the screen S.

Figure 5:
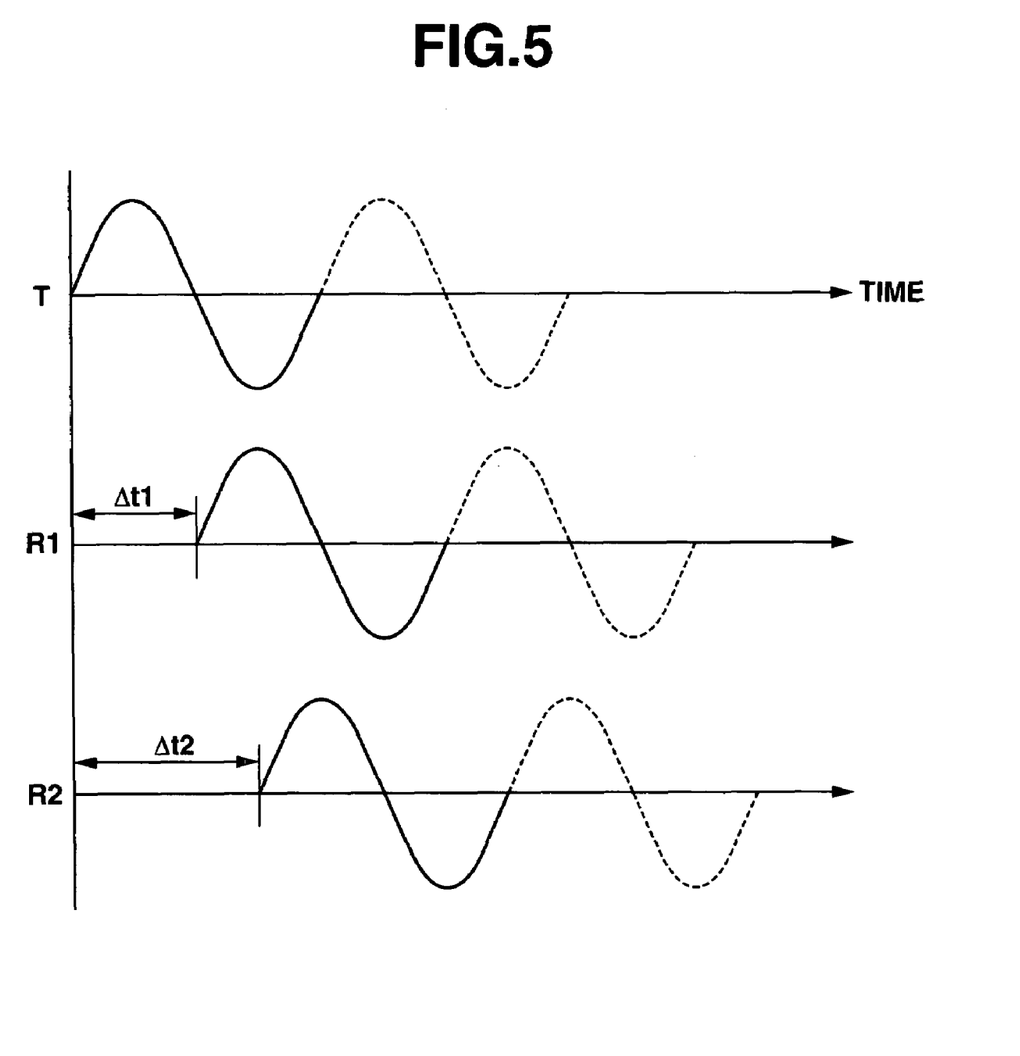
FIG. 5 is a timing chart indicative of time delays of reflected light to projected light.

As shown in FIG. 5, time lags $\Delta t1$ and $\Delta t2$ occur between projection of light T and reception of reflected light portions R1 and R2, respectively, in the vicinity of the projector 1. It is difficult to directly measure these time lags. Thus, the photoreceiver 171 detects a plurality of phase differences each between the projection light T and a respective one of the reflected light R1 and R2.

The photoreceiver 171 may comprise, for example, a distance image sensor disclosed in Published Unexamined Japanese Patent Application 2006-153773 and including a matrix array of 100×100 photodiodes.

The principle of detecting a phase difference by the distance image sensor 31 will be described. As shown in FIGS. 6A and 6B, it is assumed that the intensity of light from the light source 165 changes as shown by a curve X and that the quantity of light received changes as shown by a curve Y. A phase difference $\Delta \psi$ between the curves X and Y corresponds to a time required for the light to make a round trip between the projector and the screen S.

Figure 6:
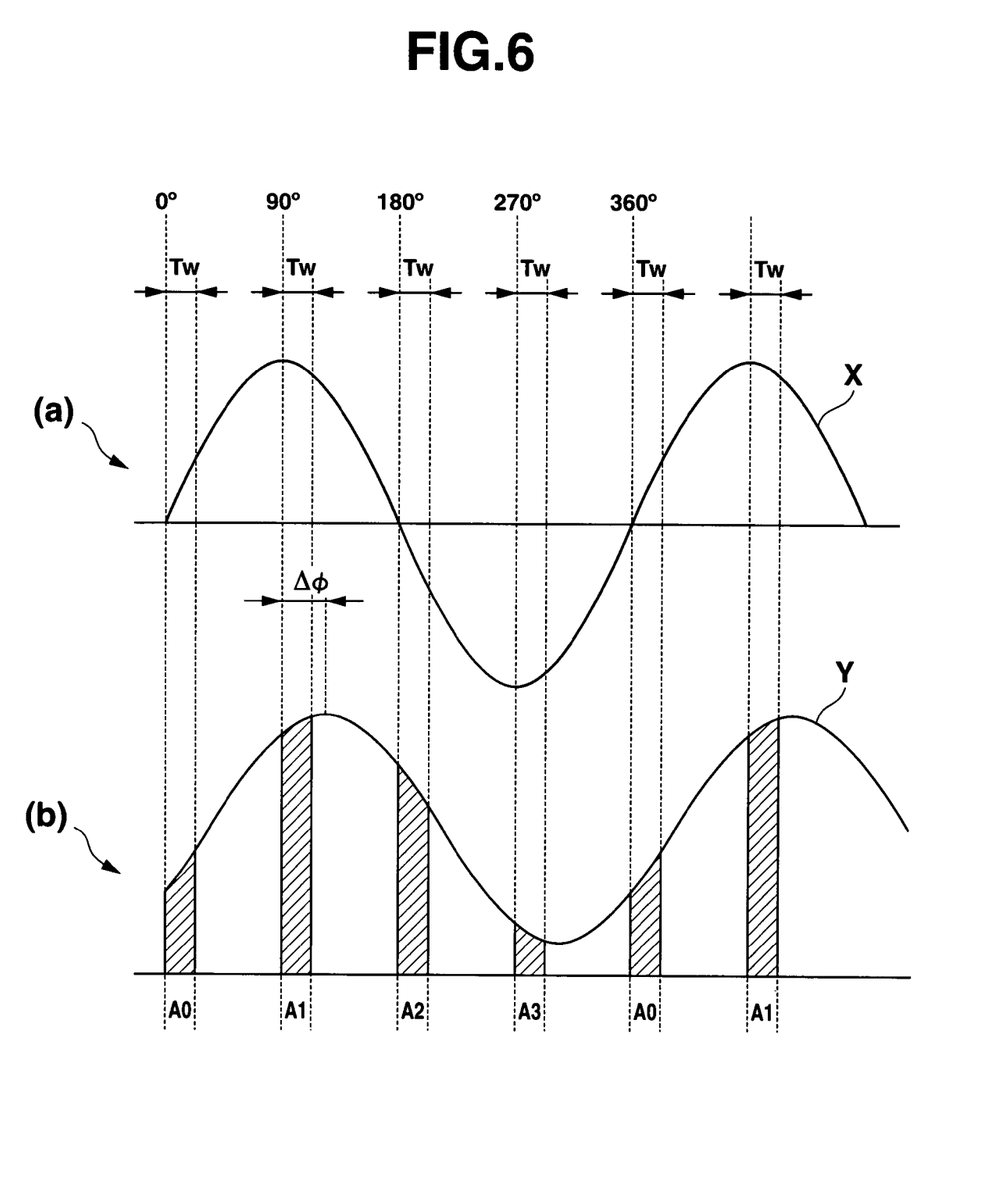
FIG. 6 is a timing chart illustrating a method of acquiring phase differences.

Received light quantities A0, A1, A2 and A3 in phase sections 0-less than 90, 90-less than 180, 180-less than 270, and 270-less than 360 degrees in FIG. 6B are calculated with reference to the phase of the curve X of FIG. 6A. The received-light quantities A0, A1, A2 and A3 are expressed in the following expressions (1)-(4), respectively:

$$A0 = A \cdot \sin(\Delta\psi) + B \quad (1)$$

$$A1 = A \cdot \sin(\pi/2 + \Delta\psi) + B \quad (2)$$

$$A2 = A \cdot \sin(\pi + \Delta\psi) + B \quad (3)$$

$$A3 = A \cdot \sin(3\pi/2 + \Delta\psi) + B \quad (4)$$

where A denotes a maximum light intensity and B denotes a DC component (indicative of an average value of external and reflective light components). In FIG. 6, Tw denotes a period for required to acquire each of the received-light quantities A0, A1, A2 and A3.

The phase difference $\Delta\psi$ is expressed by the following expression (5) from the expressions (1)-(4):

$$\Delta\psi = \tan^{-1}\{(A2 - A0)/(A1 - A3)\} \quad (5)$$

That is, the phase difference $\Delta\psi$ is calculated from the expression (5) by detecting the received light quantities A0-A3.

The light reception controller 172 controls the photoreceiver 171 so as to output quantities of signal charges corresponding to the received light quantities A0-A3. The light reception controller 172 further commands the calculation unit 173 to calculate the phase difference $\Delta\psi$ between the projected and reflected light, the respective distances to the corresponding points on the screen from the projector, and inclination angles of the screen S relative to the ideal projection screen.

The calculation unit 173 comprises a ROM, a RAM and a CPU as in the reception light controller 172. The calculation unit 173 performs the above processing tasks in accordance with commands from the photoreception controller 172. The calculation unit 173 calculates the phase difference $\Delta\psi$ based on the received light quantities A0-A3 corresponding to the quantities of signal charges outputted from the photoreceiver 171 in accordance with the expression (5).

As shown in FIG. 4, when two distances to corresponding points on the screen S from the projector 1 are acquired, the calculation unit 173 calculates received-light quantities A0-A3 of each of pixels of the photoreceiver 171 corresponding to the two points on the screen, and calculates the phase difference $\Delta\psi$ based on the received-light quantities A0-A3.

The calculation unit 173 calculates the time lags $\Delta t1$ and $\Delta t2$ based on the acquired phase difference $\Delta\psi$, the two distances each between the projector 1 and a respective one of the two points on the screen S, and then the forward or backward inclination angle of the screen S relative to the ideal projection screen, for example, when the screen S and the ideal screen have a common lower side, using a well-known technique, for example, disclosed in US Pub. No.: 2004/0252283A1. A vertical distortion of the image is corrected based on the forward or backward inclination angle obtained.

The time lag $\Delta t$ is given by the following expression:

$$\Delta t = \frac{\Delta\psi}{2\pi f} \quad (6)$$

where $\pi$ is the ratio of the circumference of circle to its diameter, and f is the frequency of projected and reflected light.

Since the time lag $\Delta t$ is substantially equal to the time required for the light to travel twice the distance between the projector 1 and the screen S, the distance, d, is given by the following expression:

$$d = \frac{1}{2} C \Delta t \quad (7)$$

where C is the light speed.

The distance, d, is also given by the following expression based on the expressions (6) and (7):

$$d = \frac{c\Delta\psi}{4\pi f} \quad (8)$$

When the screen S is inclined relative to the ideal projection screen, the two distances each between the projector 1 and a respective one of the two points on the screen are different. Thus, the reflected light R1 is different in time lag from the reflective light R2.

Figure 7:
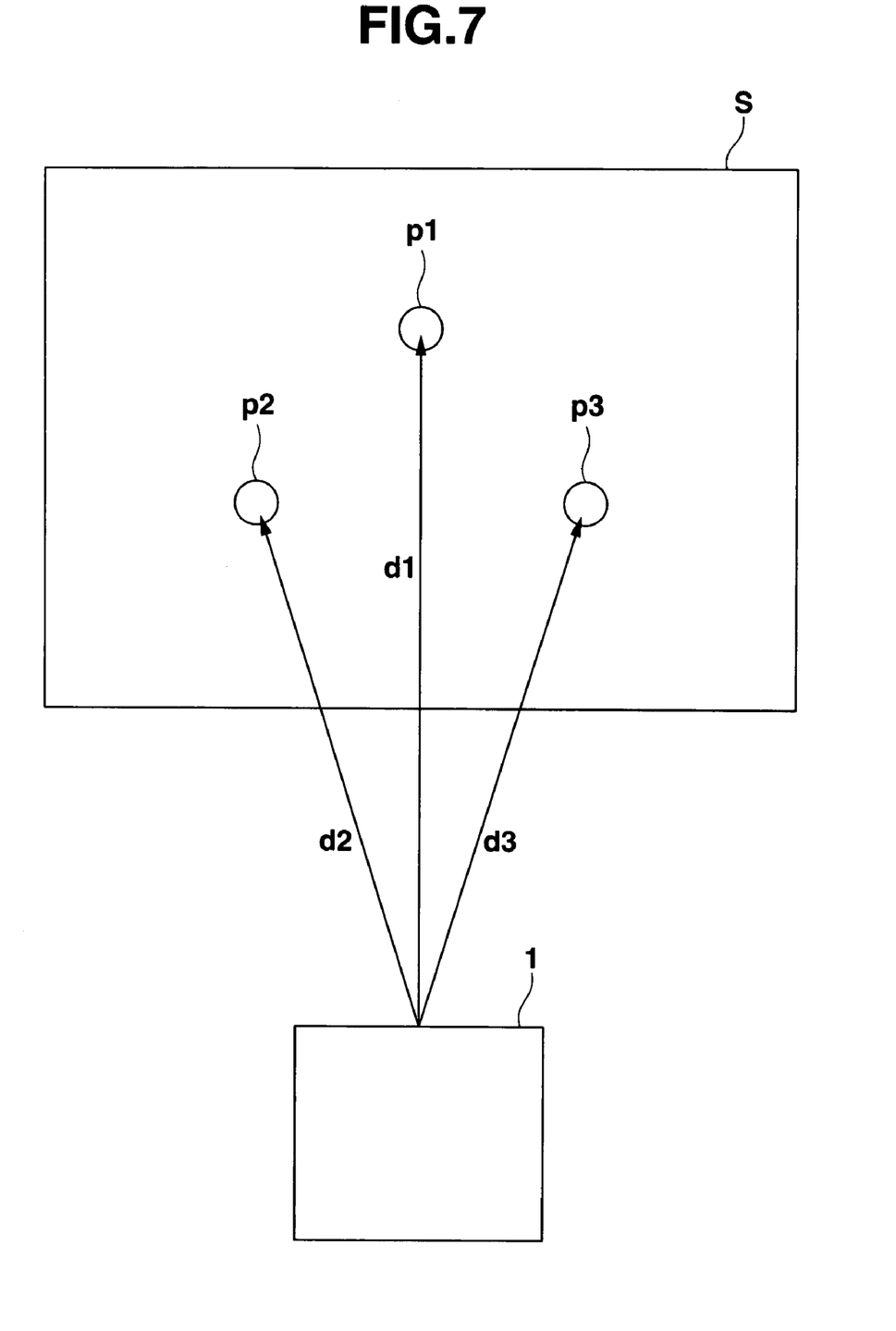
FIG. 7 illustrates three points on the screen which involve distance measurement.

FIG. 7 illustrates a positional relationship between the projector 1 and points p1, p2 and p3 in different directions on the screen S when three distances each between the projector 1 and a respective one of the points p1, p2 and p3 on the screen S are obtained. According to this method, the forward or backward inclination angle of the projection screen S relative to the ideal screen as well as a clockwise or counterclockwise rotational angle of the screen S relative to the ideal screen possibly occurring when both the screens are of the same square and have a common vertical axis is obtained. Thus, vertical and horizontal distortions of the image are corrected.

The calculation unit 173 selects the three points p1-p3 on the screen and calculates the received light quantities A0-A3 of each of the pixels of the photoreceiver 171 corresponding to the selected three points p1-p3. The calculation unit 173 calculates the distances d1-d3 from the projector 1 to the respective points p1-p3 on the screen based on the acquired light quantities A0-A3 in accordance with the expressions (6)-(8). The calculation unit 173 then calculates the inclination angles of the screen S based on the three differences d1-d3.

The key/indicator unit 18 comprises an indicator and keys which include power source, zoom, focus, AF, input switch, menu and manual operation keys.

The power source key is used to turn on/off the power source. The zoom key is used to give zoom-in/out commands. The focus key is used to give a command to move the projector 1 forward or backward from the focus position.

The AFK key is used to give commands to perform an automatic focusing function and the AKC immediately. The input switch key is used to switch a subconnector of the input/output connector 11 to input/output an image signal.

The menu key is used to give commands to display various menu items concerning the projection operation. The manual operation key is used to give various operation commands and includes a cursor key, for example.

When any one of these keys is depressed, the key/indicator unit 18 is used to deliver corresponding operation information to the controller 20. The key-indicator unit 18 comprises a power source/standby indicator which in turn comprises a display LED, for examples which indicates the on/off state of the power source and a state where no input image signal is present, by turning on/off or flashing the indicating LED.

The IR receiver 19 receives an infrared light signal indicative of operation information from a remote controller (not shown) of the projector 1.

The controller 20 is used to control operation of the respective elements. Like the light reception controller 172, the controller 20 comprises a ROM, a RAM, and a CPU. When receiving operation information from the key/indicator unit 18 and/or the IR receiver 19, the controller 20 controls the respective elements concerned of the projector based on the operation information.

More specifically, each time the controller 20 receives from the key/indicator unit 18 operation information that the power source key has been depressed, the controller 20 turns on or off the power source of the projector 1. Still more specifically, when receiving operation information that the power source key has been depressed in a state where the power source of the projector 1 is on, the power source is turned off. When receiving operation information that the power source key has been depressed in a state where the power source of the projector 1 is off, the power source is turned on.

When receiving, from the key/indicator unit 18, operation information that the AFK key has been depressed, the controller 20 commands the projection screen inclination angle measuring device 17 to measure the distance from the projector to the screen S. When receiving information on the measured distance from the measuring device 17, the controller 20 drives the lens motor 164 based on the distance information, thereby performing the automatic focusing operation.

When receiving information on the inclination angle of the screen S from the measuring device 17, the controller 20 delivers this information to the image processor 13 and then commands the image processor 13 to perform the AKC.

The image storage device 21 is used to store image data required for tasks and comprises, for example, a flash memory. The controller 20 reads image data stored in the image storage device 21, delivers it to the display encoder 15, and then causes the display encoder 15 to project an image based on the read image data.

The voice processor 23 comprises a sound source circuit including a PCM sound source, and converts voice data given in the projection/display operation to an analog signal, which drives the speaker 22 to emit sound.

In operation, when the power source key of the key/indicator unit 18 is depressed, the key/indicator unit 18 delivers a signal on this operation to the controller 20, which then turns on the power source of the projector 1.

When an image signal is delivered to the projector 1 via the input/output connector 11, the image processor 13 acquires the image signal via the system bus SB, and then converts the image signal to a second image signal of a preset format.

The display encoder 15 loads and stores, in the video RAM 14, the second image signal from the image processor 13, produces a video signal based on the second image signal stored in the video RAM 14, and then delivers the video signal to the display driver 161 of the projection unit 16.

The display driver 161 drives the SOM 162 in the respective colors in a time-divisional manner at a rate of 30 frames/second so as to correspond to the image signal received from the display encoder 15.

The SOM 162 reflects light irradiated by the light source 165. The reflected light is projected via the projection lens 163 on the screen S.

When the AFK key is depressed, the key/indicator unit 18 delivers resulting operation information to the controller 20, which then commands the photoreception controller 172 to perform an inclination angle measuring process.

Figure 8:
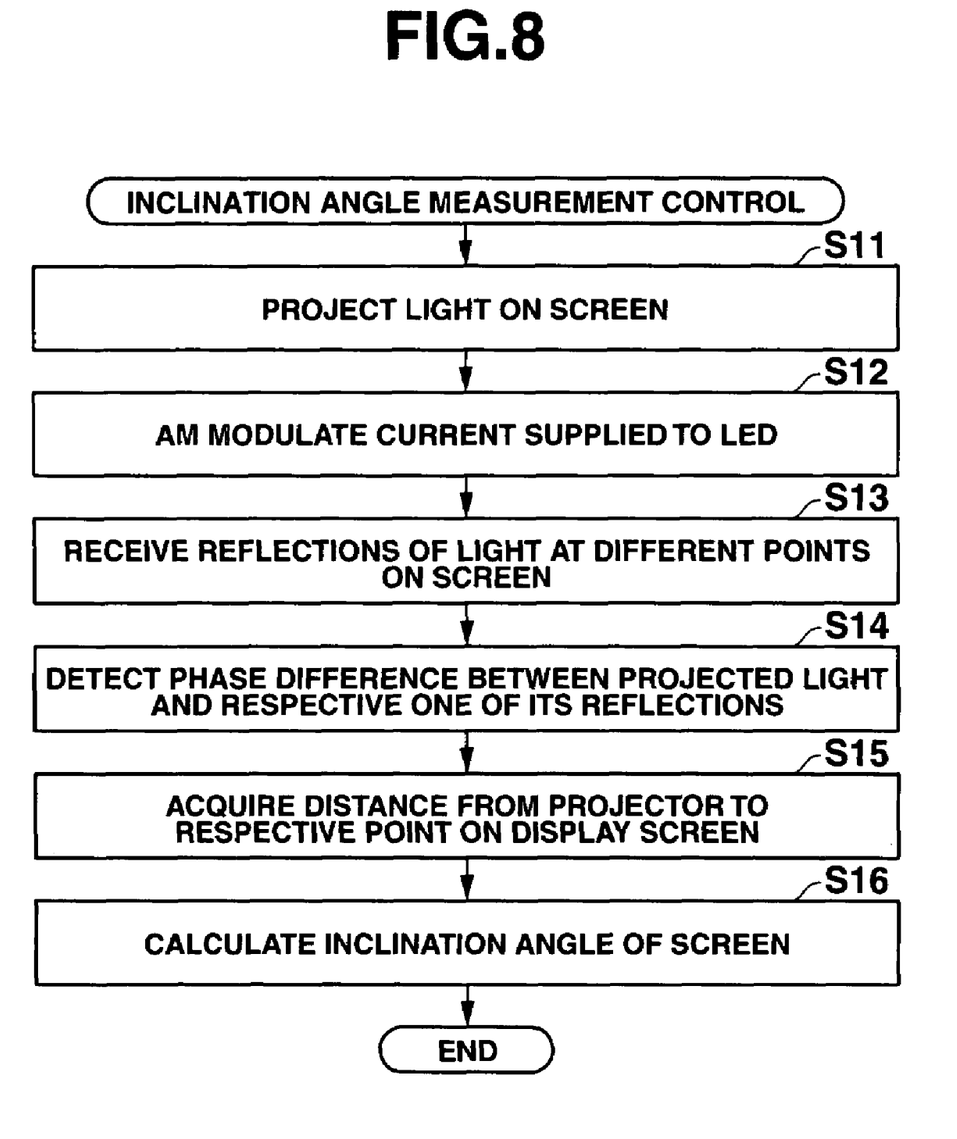
FIG. 8 is a flowchart indicative of an inclination angle measurement control process to be performed by a light reception controller of the embodiment.

The photoreception controller 172 reads an inclination angle measuring program from a built-in ROM thereof (not shown) and performs the inclination angle measuring process in accordance with a flowchart of FIG. 8.

The photoreception controller 172 controls the projection unit 16 so as to project projection light on the screen S (step S11).

The photoreception controller 172 also controls the AM modulator 165c so as to AM modulate current to be fed to the LED 165a (step S12). The photoreception controller 172 controls the photoreceiver 171 so as to receive the reflected light (step S13). The photoreception controller 172 also commands the calculation unit 173 to perform required calculations based on a quantity of signal charges outputted by the photoreceiver 171. In accordance with this command, the calculation unit 173 detects two phase differences $\Delta \psi$ each between the projected light and a respective one of the reflected light portions R1 and R2 in the expression (5) (step S14).

The calculation unit 173 calculates the distances from the projector to the respective points on the screen (step S15) and then the inclination angle of the screen S (step S16). Then, the calculation unit 173 selects the three points p1-p3 on the screen S of FIG. 7, and then calculates data on received light quantities A0-A3 represented by the signal charges which are outputted by each of those pixels of the photoreceiver 171 corresponding to the selected three points p1-p3.

The calculation unit 173 calculates the phase difference $\Delta \psi$ based on the received-light quantities A0-A3 of each of the three pixels of the photoreceiver 171 in accordance with the expression (5) (step S14). The calculation unit 173 also calculates the distances d1-d3 based on the acquired phase different $\Delta \psi$ in accordance with the expression (8) (step S15).

Then, the calculation unit 173 calculates the inclination angles of the screen S based on the calculated distances d1-d3 in the well-known method (step S16).

As described above, when the photoreception controller 172 and the calculation unit 173 perform the inclination angle measuring process, the projection screen inclination angle measuring device 17 delivers data on the distances d1-d3 and screen inclination angles calculated by the calculation unit 173 to the controller 20. The controller 20 then controls the lens motor 164 based on the data on the distances d1-d3 received from the measuring device 17 so as to perform the automatic focusing function. The controller 20 then delivers to the image processor 13 the data on the inclination angles of the screen S received from the measuring device 17 and commands the image processor 13 to perform the AKC function.

The image processor 13 acquires conversion parameters based on the data on the inclination angles of the screen S received. Then, the image processor 13 performs the AKC function on the image signal received via the system bus SB, using the conversion parameters. Even if the screen S is inclined, a distortion-free image which would be obtained if the screen S is perpendicular to, or not inclined to, the optical axis is displayed on the screen S.

As described above, according to the present embodiment, the light source 165 performs a light intensity modulation on the projected light. The projector 1 projects the modulated light on the screen S. The photoreceiver 171 of the measuring device 17 receives reflective light portions from the three points p1-p3 on the screen S and then detects a phase difference $\Delta\psi$ of the reflective light portions relative to the projected light.

The calculation unit 173 acquires a time delay $\Delta t$ based on the phase difference $\Delta\psi$, acquires information on the distances from the projector 1 to the three points p1-p3 on the screen S, and then acquires the inclination angle of the screen S. Then, the image processor 13 performs the AKC based on the inclination angle of the screen S.

Since the distances each between the projector and a respective one of the three points p1-p3 on the screen S are acquired based on the phase difference $\Delta\psi$, the projector 1 acquires the inclination angles of the screen S with high accuracy compared to the triangular distance measuring method.

Thus, the projector 1 improves the accuracy of the AKC, which renders the distance measuring optical modulation element and the distance measurement-only light source useless and reduces the size of the projector 1.

Various changes and modifications are possible in carrying out the present invention, and the present invention is not limited to the above embodiment:

In the embodiment, for example, a modulation frequency for use in the AM modulator 165c of the light source 165 is not limited to 10 MHz, but may be higher or lower.

In the embodiment, the light emission element of the light source 165 is not limited to the LED 165a, but a laser may be used for AM modulation. Note that when the laser is used, a lens that will disperse the laser beam is required.

While in the embodiment the light source 165 is illustrated as including the AM modulator 165c, the display driver 161 may be arranged so as to control the SOM 162 so as to AM modulate the projected light instead of the AM modulator 165c being provided in the light source 165. Alternatively, a light quantity adjustor may be provided for the projection lens 163 to modulate the intensity of the projected light.

While in the embodiment the projection screen inclination measuring device 17 is illustrated as including the distance image sensor 31 as the photoreceiver 171, the photoreceiver 171 is not limited to the distance image sensor 31, but may be an avalanche photodiode. Note, however, that use of the distance image sensor 31 as the photoreceiver 171 serves to achieve fine settings in a simple construction compared to an arrangement that employs the avalanche photodiode.

In the above embodiment, when the AFK key of the key/indicator unit 18 is depressed, the projector 1 is illustrated as performing the AKC. However, even when the AFK key is not depressed, the projector 1 may measure the distances periodically and make the AKC completely.

While in the embodiment the projection screen inclination angle measuring device 17 is illustrated as measuring the inclination angles of the screen S. However, the measuring device 17 may only measure the distance from the projector to the screen S.

Also in this case, the projector 1 operates in the same manner as the inclination angles of the screen S are measured. In this case, the photoreceiver 171 may only include a single photodiode and the number of points on the screen S involving the distance measurement may be one.

In the above embodiment, the programs are illustrated as stored beforehand in the memory or the like. Alternatively, a computer-readable recording medium such as a flexible disk, CD-ROM (Compact Disk Read-Only Memory), DVD (Digital Versatile Disk) or MO (Magneto Optical) disk which has stored the program that operates the projector as the whole or a part of a device or that executes the above-mentioned process may be loaded and installed in a computer, thereby causing the computer to operate as the above-mentioned means or perform the above-mentioned processes.

In addition, the program may be stored beforehand, for example, in a disk device provided in a server device on the Internet so as to be carried by a carrier wave and downloaded in computers as required.

Other various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2006-221182 filed on Aug. 14, 2006, respectively, and each including specification, claims, drawings and summary. The disclosure of the above Japanese patent application is incorporated herein by reference in its entirety.

What is claimed is:

1. A projector comprising:
   a projection unit that projects image light on a projection screen, the projection unit comprising a light source, an SOM (Spatial Optical Modulator), and a projection lens;
   an optical modulator that modulates an intensity of the image light to be projected by the projection unit;
   a photoreception unit that receives a portion of the image light reflected by a point on the projection screen; and
   a distance measurement unit that detects a phase difference at the photoreception unit between the image light projected by the projection unit and the portion of the image light reflected by the point on the screen, and that measures a distance from the projector to the point on the projection screen based on the phase difference detected,
   wherein the projector projects the image light, produced by the light source and the SOM, through the projection lens on the projection screen, thereby displaying an image; and
   wherein in the distance measurement: (i) the image light produced by the light source and the SOM is projected through the projection lens; and (ii) the portion of the projected image light reflected by the point on the projection screen is received, thereby acquiring the distance from the projector to the point on the projection screen.

2. The projector of claim 1, wherein:
   the light source is supplied with an electric current, thereby producing light; and
   the optical modulator AM modulates the current with which the light source is supplied, thereby modulating the intensity of the image light.

3. The projector of claim 2, wherein the light source comprises a light emitting diode.

4. The projector of claim 2, wherein the light source comprises a laser.

5. A projector comprising:
a projection unit that projects image light on a projection screen, the projection unit comprising a light source, an SOM (Spatial Optical Modulator) and a projection lens;
an optical modulator that modulates an intensity of the image light to be projected by the projection unit;
a photoreceiver that comprises a plurality of photoreception elements disposed at a plurality of points for receiving portions of the projected image light reflected by a like number of points on the projection screen;
a distance measurement unit that detects a plurality of phase differences between the projected image light and each of the portions of the projected image light reflected by the like number of points on the projection screen and received by the plurality of photoreception elements, and that measures a plurality of distances from the projector to each of the like number of points on the projection screen based on the respective detected phase differences; and
an inclination angle acquiring unit that acquires an inclination angle of the projection screen relative to an ideal projection screen perpendicular to an optical axis of the projected image light based on the distances acquired by the distance measurement unit,
wherein the projector projects the image light, produced by the light source and the SOM, through the projection lens on the projection screen, thereby displaying an image; and
wherein in the distance measurement: (i) the image light produced by the light source and the SOM is projected through the projection lens; and (ii) the portions of the projected image light reflected by the like number of points on the projection screen are received, thereby acquiring the distances from the projector to each of the like number of points on the projection screen.

6. The projector of claim 5, wherein:
the light source that is supplied with an electric current, thereby producing light; and
the optical modulator AM modulates the current with which the light source is supplied, thereby modulating the intensity of the image light.

7. The projector of claim 6, wherein the light source comprises a light emitting diode.

8. The projector of claim 6, wherein the light source comprises a laser.

9. The projector of claim 5, wherein the photoreception unit comprises a distance image sensor including a matrix array of photoreception units for acquiring a distance from a given photoreception unit to a corresponding one of the like number of points on the projection screen based on a quantity of light received by that photoreception unit.

10. A method of measuring a distance between a projector and a point on a projection screen, the method comprising:
projecting image light on a projection screen using a light source, an SOM (Spatial Optical Modulator), and a projection lens;
modulating an intensity of the image light to be projected;
receiving a portion of the projected image light reflected by a point on the projection screen; and
detecting a phase difference at the projector between the image light projected and the portion of the image light reflected by the point on the screen, and measuring the distance from the projector to the point on the projection screen based on the phase difference detected,
wherein the projector projects the image light, produced by the light source and the SOM, through the projection lens on the projection screen, thereby displaying an image; and
wherein in the distance measurement: (i) the image light produced by the light source and the SOM is projected through the projection lens; and (ii) the portion of the projected image light reflected by the point on the projection screen is received, thereby acquiring the distances from the projector to the point on the projection screen.

11. A method of acquiring an inclination angle of a projection screen for a projector, the method comprising:
projecting image light on the projection screen using a light source, an SOM (Spatial Optical Modulator), and a projection lens;
modulating the intensity of the image light to be projected;
receiving, at a plurality of points, portions of the projected image light reflected at a like number of points on the projection screen;
detecting, at the projector, a plurality of phase differences between the projected image light and each of the portions of the projected image light reflected at the like number of points on the projection screen, and measuring a plurality of distances from the projector to each of the like number of points on the projection screen; and
acquiring an inclination angle of the projection screen relative to an ideal projection screen perpendicular to an optical axis of the projected image light based on the distances acquired,
wherein the projector projects the image light, produced by the light source and the SOM, through the projection lens on the projection screen, thereby displaying an image; and
wherein in the distance measurement: (i) the image light produced by the light source and the SOM is projected through the projection lens; and (ii) the portions of the projected image light reflected by the like number of points on the projection screen are received, thereby acquiring the distances from the projector to each of the like number of points on the projection screen.

12. A software program product embodied in a computer readable medium for performing the method of claim 10.

13. A software program product embodied in a computer readable medium for performing the method of claim 11.

* * * * *

UNITED STATES PATENT AND TRADEMARK OFFICE
CERTIFICATE OF CORRECTION

| | |
|---|---|
| PATENT NO. | : 7,667,825 B2 |
| APPLICATION NO. | : 11/891564 |
| DATED | : February 23, 2010 |
| INVENTOR(S) | : Hideaki Inoue |

It is certified that error appears in the above-identified patent and that said Letters Patent is hereby corrected as shown below:

In the Claims:

Column 12, Line 25, (Claim 11, Line 6);

After "modulating" change "the" to --an--.

Column 12, Line 31, (Claim 11, Line 12);

After "reflected" change "at" to --by--.

Signed and Sealed this

Nineteenth Day of October, 2010

David J. Kappos
*Director of the United States Patent and Trademark Office*